US012616182B2

(12) United States Patent
    Price

(10) Patent No.: US 12,616,182 B2
(45) Date of Patent: May 5, 2026

(54) ANGLED PLANAR BOARD AND SET CONFIGURED TO AVOID FISHING LINE ENTANGLEMENT

(71) Applicant: Marty Gale Price, Monroe, NC (US)

(72) Inventor: Marty Gale Price, Monroe, NC (US)

( * ) Notice: Subject to any disclaimer, the term of this patent is extended or adjusted under 35 U.S.C. 154(b) by 0 days.

(21) Appl. No.: 18/999,997

(22) Filed: Dec. 23, 2024

(65) Prior Publication Data

US 2025/0331506 A1      Oct. 30, 2025

Related U.S. Application Data

(60) Provisional application No. 63/731,401, filed on Apr. 30, 2024.

(51) Int. Cl.
    A01K 91/08          (2006.01)

(52) U.S. Cl.
    CPC .................................... A01K 91/08 (2013.01)

(58) Field of Classification Search
    CPC ...................................................... A01K 91/08
    See application file for complete search history.

(56) References Cited

U.S. PATENT DOCUMENTS

| | | | | |
|---|---|---|---|---|
| 3,949,512 | A | * | 4/1976 | Stegemeyer ........... A01K 91/08 |
| | | | | 43/43.13 |
| 5,341,591 | A | | 8/1994 | Hicks |
| 5,875,583 | A | | 3/1999 | Church |

| | | | | |
|---|---|---|---|---|
| 6,000,167 | A | * | 12/1999 | Bowman ................. A01K 91/08 |
| | | | | 43/43.13 |
| 6,119,389 | A | * | 9/2000 | Walker .................... A01K 91/08 |
| | | | | 43/17 |
| 6,412,215 | B1 | * | 7/2002 | Even ...................... A01K 91/08 |
| | | | | 43/43.13 |
| 7,380,366 | B1 | * | 6/2008 | Barrow .................. A01K 91/08 |
| | | | | 43/42.22 |
| 2007/0193107 | A1 | * | 8/2007 | Garrett ................... A01K 91/08 |
| | | | | 43/43.13 |
| 2008/0282598 | A1 | * | 11/2008 | Spickelmire ........... A01K 91/08 |
| | | | | 43/43.13 |
| 2008/0307692 | A1 | | 12/2008 | Hagen et al. |
| 2017/0035037 | A1 | | 2/2017 | Ayers, Jr. |
| 2019/0053479 | A1 | | 2/2019 | Vergara |

OTHER PUBLICATIONS

NPL Perfect Planer Board—Captain Mack's https://www.captmacks. com/store/product/perfect-planer-board/ Apr. 2023.*

* cited by examiner

*Primary Examiner* — Richard G Davis
(74) *Attorney, Agent, or Firm* — Jeffrey C. Watson, Esq.; Grell & Watson Patent Attorneys LLC

(57)          ABSTRACT

A system and process for entanglement avoidance of multiple fishing lines being cast and driven from the motivation of a fishing boat or a stream of moving water such as a creek or river involving individual fishing line director components designed to utilize the relative mass flow of water around it for the separation of adjacent fishing line directors and accomplishing it's stable relative position behind a boat or moving water source via setting of it's forward rudder angle which creates more or less lateral force to maintain a specific lateral position allowing multiple fishing lines to spread apart behind a boat or moving water source.

17 Claims, 11 Drawing Sheets

ANGLED PLANAR BOARD AND SET CONFIGURED TO AVOID FISHING LINE ENTANGLEMENT

CROSS-REFERENCE TO RELATED APPLICATIONS

This application claims benefit to U.S. Provisional Patent Application No. 63/731,401, filed on Apr. 30, 2024, which is incorporated by reference in its entirety.

FIELD OF THE DISCLOSURE

The present invention relates generally to a system and method for entanglement avoidance of multiple fishing lines being cast and driven from the motivation of a fishing boat or a stream of moving water such as a creek or river.

BACKGROUND

Trolling is a method of fishing where one or more fishing lines, baited with lures or bait fish, are drawn through the water at a consistent, low speed. This may be behind a moving boat, or by slowly winding the line in when fishing from a static position, or even sweeping the line from side-to-side, e.g. when fishing from a jetty. Trolling from a moving boat involves moving quite slowly through the water. Multiple lines are often used, and line-spreading trolling devices can be used reduce their chances of tangling. Trolling, as used herein, may also refer to fishing in currents, like river bank fishing, where a line or multiple lines are casted out into position in the river, where the lures or bait fish are dragged through the current, i.e. the position of the lure or bait is held constant in the moving current.

There are many forms of line-spreading trolling devices, including outriggers, downriggers, paravanes, spreaders, and planar boards. Outriggers are poles which allow a boat to troll several lines in the water without tangling. A downrigger is a device used while trolling to keep a baited hook or lure at the desired depth. In practice, fish swim at different depths according to factors such as the temperature and amount of light in the water, and the speed and direction of water currents. A downrigger consists of a horizontal pole which supports a weight, typically about 6 pounds lead, on a steel cable. A clip called a "line release" attaches the fishing line to the weight, and the bait or lure is attached to the release. Paravanes, also known as underwater kites, are sometimes used as depth controlling devices, particularly in commercial tuna fishing operations. These kites have various shapes, such as arrowhead paravanes, flexi-wing paravanes, and bi-wing paravanes. These paravanes devices can place the lure or bait at designated depths and positions; and in this way multiple devices can be towed at the same time without the devices and bait interfering with each other. Spreaders are devices that allow multiple baited hooks or lures to be trolled from a single line. There are many inventive spreader designs, such as devices which cause the baited hooks or lures to move in helical patterns, or in other various sophisticated emulation of the schooling behavior of schools of fish. Planar boards are trolled devices designed to spread fishing lures out away from the fishing vessel. They allow multiple lines to be trolled. They come in dual board and inline board designs. Dual board designs consist of two boards that are spaced apart and attached by a line to a mast near the front of the boat with a separate fishing line in a spring tension release clip that separates when the fishing line is set. Inline boards are attached directly to the fishing line and a spring tension clip that releases upon setting or tripping the planar board so it slides down the fishing line to a swivel tied several feet in front of the lure. Once tripped they offer much less resistance when reeling in a fish As such, techniques for the avoidance of fishing lines are known. Furthermore, the known methodologies utilize separation of fishing lines via: fishing lines attached to broad members (spreader bars) dragged behind a boat or moving water relative to the fishing line deployment. However, obtaining consistent separation of the fishing lines during a fishing episode has long been a problem. Prior systems have attempted to manage fishing lines' separation by the dragging of spreader bars with the fishing lines attached with spacing along the breath of the spreader bar with limited success as the fishing lines have no function by design to stay separated, and, as such, eventually find themselves entangled due to boat or water stream change of direction, therefore is limited in its application. As such, there is a need in the art for fishing line separation systems that will manage multiple fishing lines utilizing individual fishing line motivation for the collective separation of the entire number of fishing lines employed during a fishing episode.

The instant disclosure may be designed to address at least certain aspects of the problems or needs discussed above by providing an angled planar board and set configured to avoid fishing line entanglement.

SUMMARY

The present disclosure may solve the aforementioned limitations of the currently available fishing devices and means for fishing, by providing an angled planar board and set configured to avoid fishing line entanglement in a current. The disclosed angled planar board and set may generally include a floating member configured to float. The floating member may include a front end with an angled face. Wherein, when the fishing line is connected to the floating member on the front end and the floating member is exposed to the current, the angled face provides a predictable lateral force to the floating member based on the current.

One feature of the disclosed angled planar board and set may be that the floating member can further include a front hole positioned in the angled face. Wherein, the front end of the floating member may be configured to be connected to the fishing line via the front hole. In select embodiments, the front hole may be centered about a width of the floating member in the angled face.

Another feature of the disclosed angled planar board and set may be that the floating member may further can include a bottom surface with a bottom hole positioned therein. The bottom hole may be connected with the front hole via a connecting channel. In select embodiments, the bottom hole may be positioned on the bottom surface at a balance point location of the floating member. The balance point location of the floating member may be a centroid of the floating member. In select embodiments, the centroid of the floating member may be determined by first lining up three of the angled planar boards. Then draw two lines from furthest points and find the intersection of the two lines. Wherein, the intersection of the two lines may be the centroid.

Another feature of the disclosed angled planar board and set may be that the fishing line can be configured to be connected to the front end of the floating member by inserting the fishing line through the connecting channel. The fishing line may include a hook or a lure at a distal end hanging from the bottom hole on the bottom surface. In select embodiments, the fishing line may further include a slip stop. The slip stop may be positioned on the fishing line and can be configured to allow a depth of the hook or the lure from the bottom surface to be adjusted. The slip stop may also be configured to allow the angled planar board to be cast into position in the current. In select embodiments, the fishing line may further include a swivel connection on the fishing line. The swivel connection may be configured to allow the hook or the lure to rotate freely. In select embodiments, the fishing line may further include a sinker. The sinker may be connected on the fishing line approximate the hook or the lure. The sinker may be configured to provide weight to the fishing line approximate the hook or the lure. In other select embodiments, the fishing line may further include the slip stop, the swivel connection, and the sinker.

In select embodiments of the angled planar board and set, the connecting channel from the front hole to the bottom hole may include a recess in the bottom hole. A bottom sleeve may be seated therein the recess in the bottom hole. A font sleeve may be recessed in the front hole. A tube may be connected between the bottom sleeve and the font sleeve.

Another feature of the disclosed angled planar board and set may be the inclusion of a color scheme. The color scheme may include a top portion color and a bottom portion color. The top portion color may be highly visible, whereby the top portion color may be configured to be visible on top of the current to fisherman. The bottom portion color may be an obscure color, whereby the bottom portion color may be configured to be obscured from fish.

Another feature of the disclosed angled planar board and system may be that the angled face on the front end of the floating member may be configured to be adjustable. Having the angled face on the front end of the floating member adjustable may be for providing an adjustable lateral force to the floating member based on the current.

In another aspect, the instant disclosure embraces the angled planar board in any of the various embodiments and/or combination of embodiments shown and/or described herein.

In another aspect, the instant disclosure embraces a set of the angled planar boards configured to avoid entanglement of fishing lines. The set of the angled planar boards may include a set or plurality of the angled planar boards in any of the various embodiments and/or combination of embodiments shown and/or described herein. In general, each of the angled planar boards of the set may include a floating member configured to float. The floating member of each of the angled planar boards of the set may include a front end. The front end may include an angled face. A front hole may be positioned in the angled face. Wherein, when one of the fishing lines is connected to the floating member on the front end and the floating member is exposed to the current, the angled face may provide a predictable lateral force to the floating member based on the current. The angled face of each of the set of the angled planar boards may be different. Wherein the predictable lateral force to each of the floating members may be different.

In select embodiments of the set of the angled planar boards, the angled face of each of the angled planar boards of the set may be different at a calculated interval. Wherein, the predictable lateral force to each of the floating members may be different at the calculated interval for spacing each of the set of the angled planar boards in the current.

Another feature of the disclosed set of the angled planar boards may be that the set can include a plurality of left pulling angled planar boards and a plurality of right pulling angled planar boards. In select embodiments, the plurality of left pulling angled planar boards may include a first color scheme and a first numbering scheme. The first numbering scheme may be configured to identify the different angled faces of each of the plurality of left pulling angled planar boards. In select embodiments, the plurality of right pulling angled planar boards may include a second color scheme and a second numbering scheme. The second numbering scheme may be configured to identify the different angled faces of each of the plurality of right pulling angled planar boards. Wherein, the first color scheme may be dissimilar from the second color scheme for differentiating the plurality of left pulling angled planar boards from the plurality of right pulling angled planar boards. In select embodiments, the plurality of left pulling angled planar boards may include seven of the left pulling angled planar boards with the first numbering scheme being 1-7. In select embodiments, the plurality of right pulling angled planar boards may include seven of the right pulling angled planar boards with the second numbering scheme being 1-7.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present invention is illustrated and described herein with reference to the various drawings, in which like reference numbers are used to denote like system components/method steps, as appropriate, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-17, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed as limited to the embodiments set forth herein. The examples set forth herein are non-limiting examples and are merely examples among other possible examples.

Figure 14:
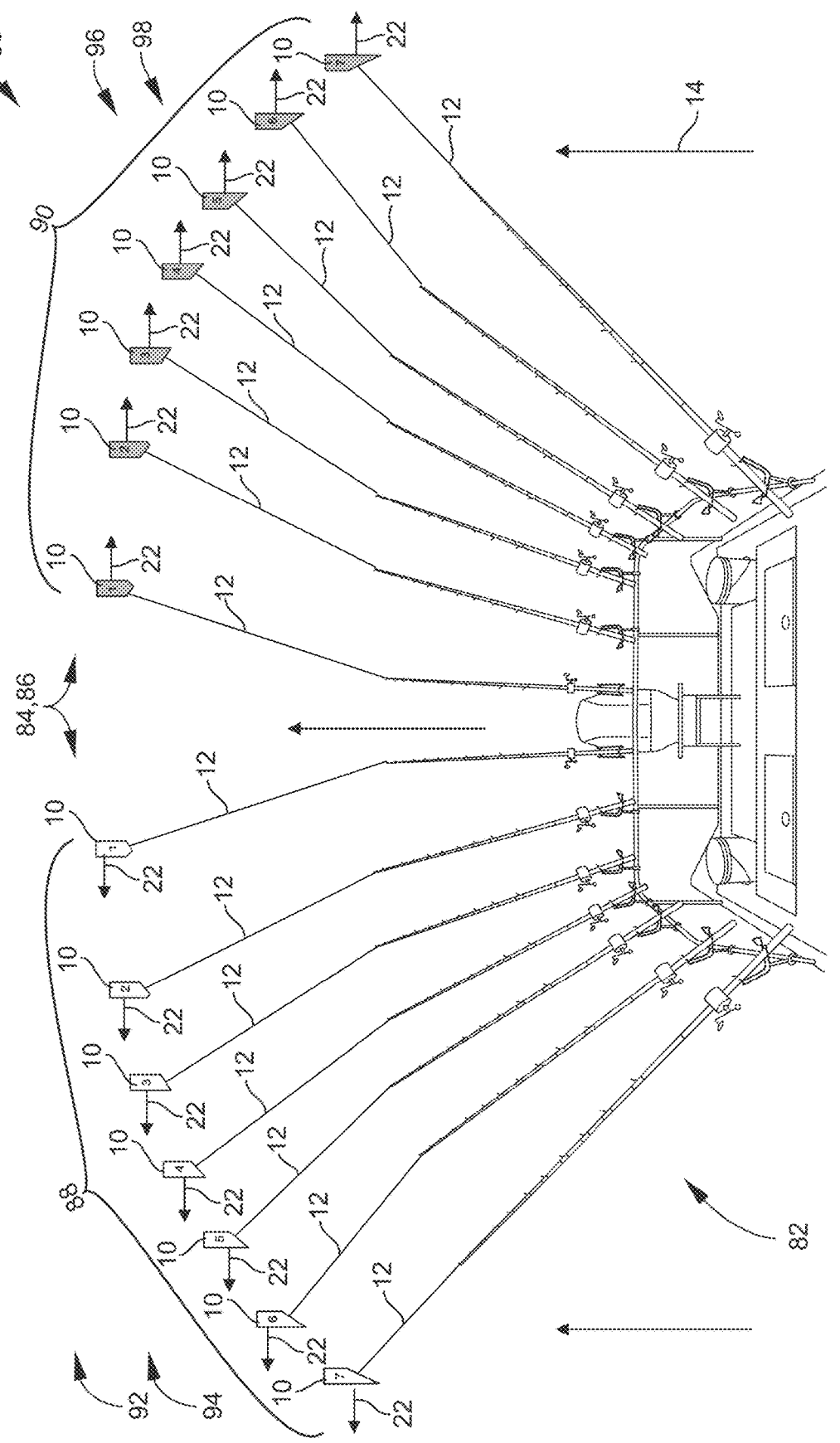
FIG. 14 is a top schematic view of a set of angled planar boards according to select embodiments of the instant disclosure being trolled off of the back of a boat, with a set of left pulling angled planar boards spaced out off the left side of the back of the boat, and a set of right pulling angled planar boards spaced out off the right side of the back of the boat.
Figure 17:
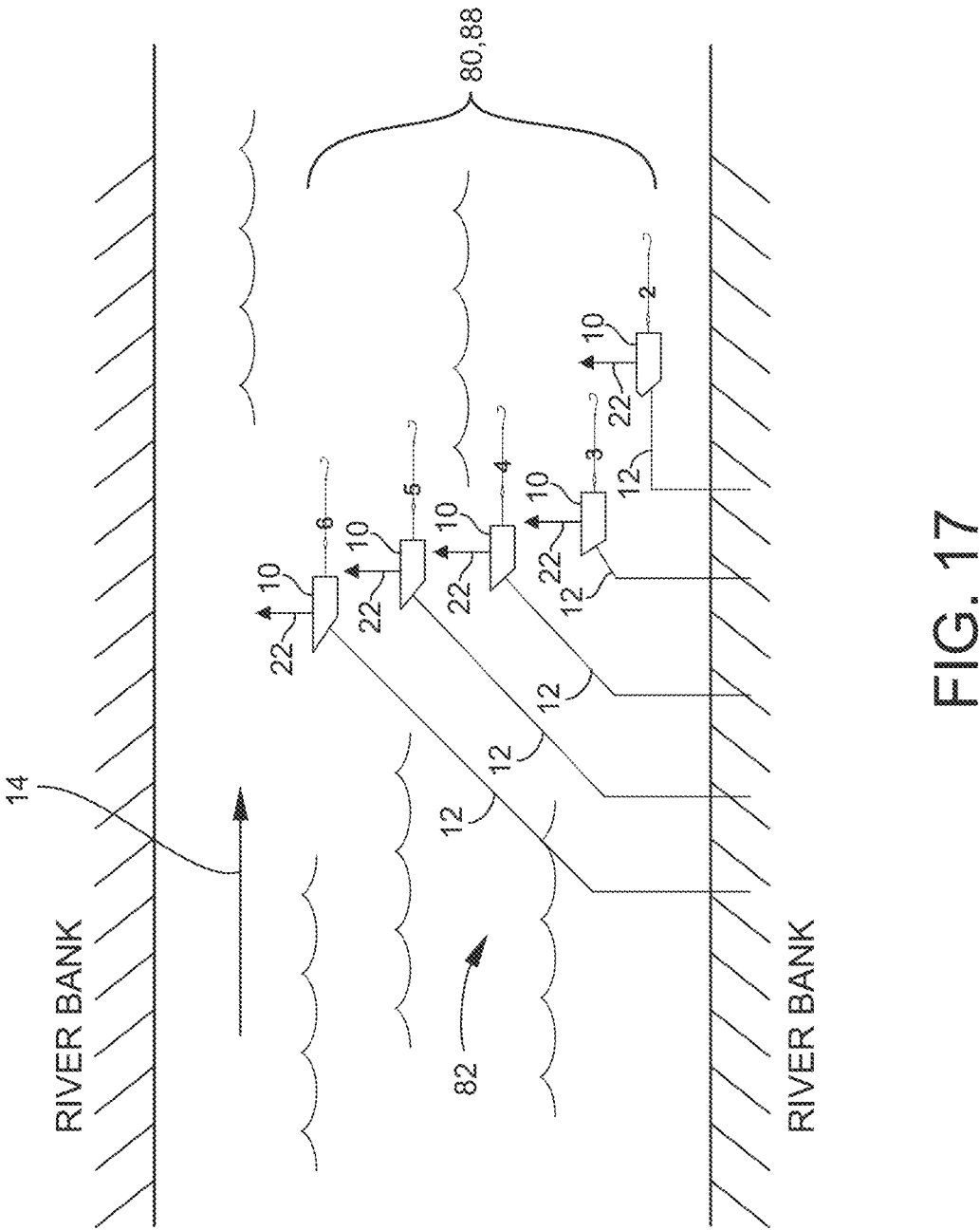
FIG. 17 is a top schematic view of a set of angled planar boards according to select embodiments of the instant disclosure being casted off the bank of a river, stream, or the like, with a set of left pulling angled planar boards spaced out off the side of the bank.

The present disclosure may solve the aforementioned limitations of the currently available fishing devices and means for fishing, by providing angled planar board 10 and set 80 configured to avoid entanglement of fishing line 12 or multiple fishing lines 82 in a current 14. As used herein, current 14 may refer to angled planar board 10 or set 80 of angled planar boards 10 being dragged or trolled through stationary (or almost stationary) bodies of waters, like lakes, ponds, oceans, etc., like as shown in FIG. 14, or current 14 may also refer to angled planar board 10 or set 80 of angled planar boards 10 being casted out into moving bodies of water, like streams, rivers, tides, etc., like as shown in FIG. 17. Angled planar board 10 and set 80 may generally include floating member 16 configured to float. Floating member 16 may be made of any buoyant material configured to float. In select possibly preferred embodiments, floating member 16 may be constructed from a wood material. However, the disclosure is not so limited and floating member 16 may be made from other buoyant materials, like plastics, foams, rubbers, PVC, the like, etc. Floating member 16 may include front end 18 with angled face 20. Angled face 20 may be provided on front end 18 of floating member 16 for creating predictable lateral force 22 on angled planar board 10 when it is exposed to current 14. Wherein, when fishing line 12 is connected to floating member 16 on front end 18 and floating member 16 is exposed to current 14, angled face 20 provides predictable lateral force 22 to floating member 16 based on current 14 (see FIGS. 14 and 17).

Figures 1, 2:
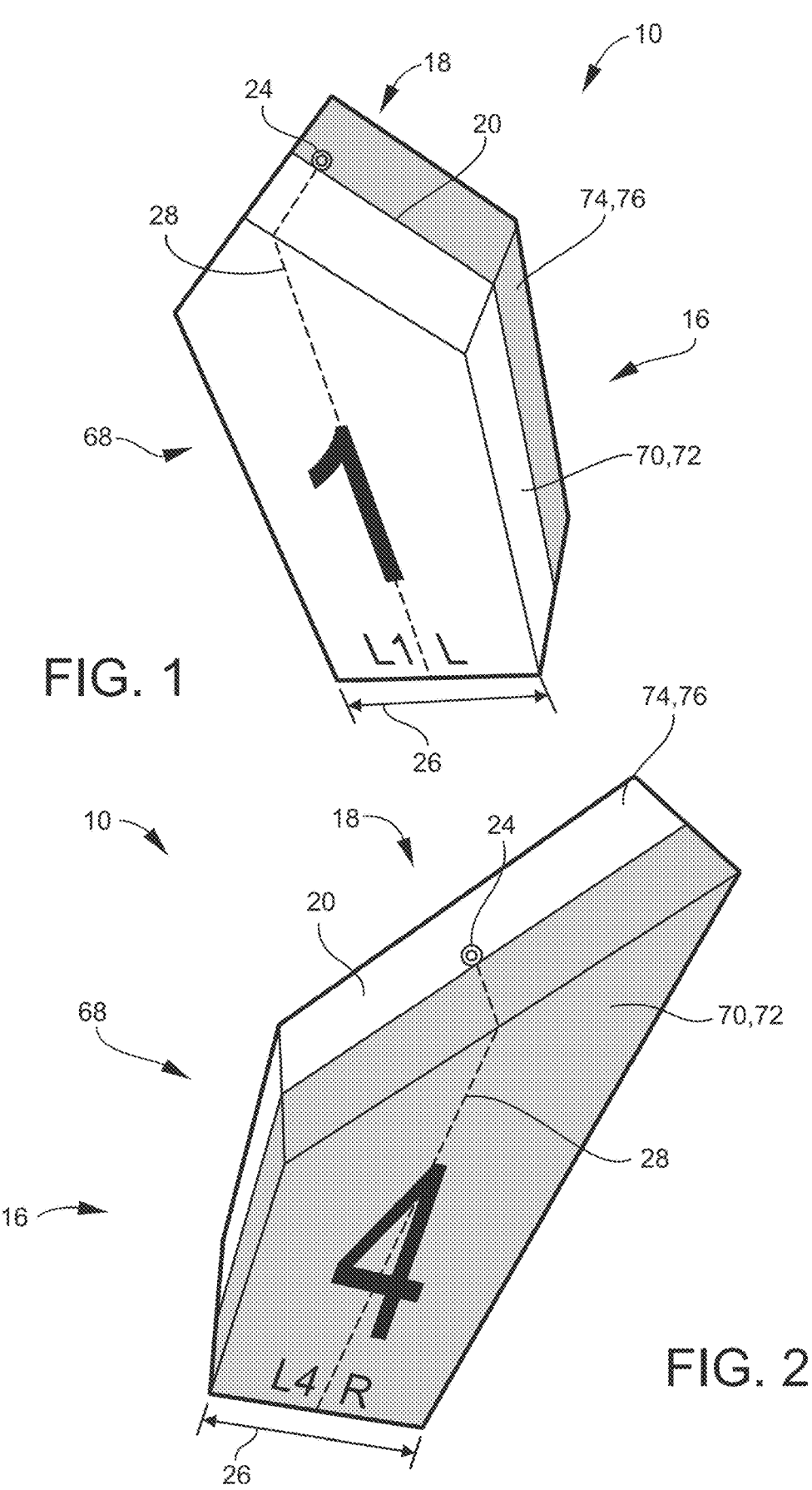
FIG. 1 is a perspective view of an angled planar board according to select embodiments of the instant disclosure.
FIG. 2 is a perspective view of another angled planar board according to select embodiments of the instant disclosure.

As best shown in FIGS. 1-5, 12 and 13, one feature of angled planar board 10 and set 80 may be that floating member 16 can further include front hole 24. Front hole 24 may be positioned in angled face 20 on front end 18 of floating member 16. Front hole 24 may be for connecting fishing line 12 to floating member 16. With fishing line 12 connected to front hole 24 on angled face 20 on front end 18 of floating member 16, angled face 20 may provide predictable lateral force 22 to floating member 16 when exposed to current 14. Wherein, front end 18 of floating member 16 may be configured to be connected to fishing line 12 via front hole 24. In select embodiments, front hole 24 may be centered about width 26 of floating member 16 in angled face 20. This is best shown in FIGS. 1-2, with center line 28 shown of width 26 of floating member 16.

As best shown in FIGS. 3-6, another feature of angled planar board 10 and set 80 may be that floating member 16 may further include bottom surface 30 with bottom hole 32 positioned therein. Bottom hole 32 may be for connecting hook or lure 48 to bottom surface 30 of floating member 16. In select embodiments, bottom hole 32 may be connected with front hole 24 via connecting channel 34 (see FIGS. 3-5). In select embodiments, bottom hole 32 may be positioned on bottom surface 30 at balance point location 36 of floating member 16. Balance point location 36 of floating member 16 may be a position on floating member 16 to attach hook or lure 48 to floating member 16 where floating member 16 is most stable in current 14. Balance point location 36 of floating member 16 may be centroid 38 of floating member 16. As such, balance point location 36 of floating member 16 may be determined by standard mathematical formulas for finding centroid 38 of a trapezoid or like shape. As shown in FIG. 7, in select embodiments, centroid 38 of floating member 16 may be determined by first lining up three of the angled planar boards 10, as represented with reference number 40. Then one can draw two lines 42 from furthest points 44 and find the intersection 46 of the two lines 42. Wherein, the intersection 46 of the two lines 42 drawn may be the centroid 38 of like shaped floating member 16.

Figure 3:
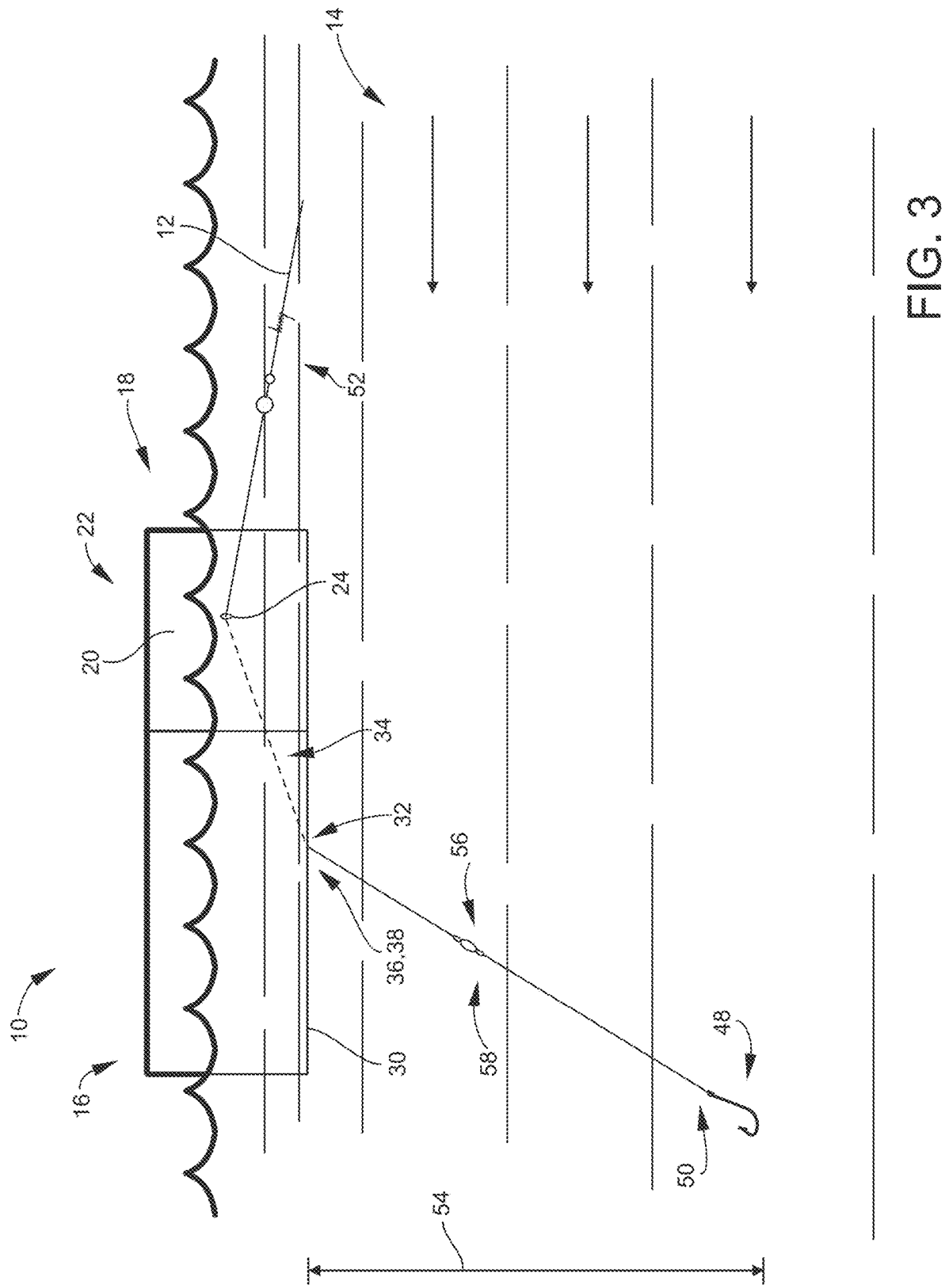
FIG. 3 is a side view of an angled planar board according to select embodiments of the instant disclosure floating in water with a fishing line attached to the front angled portion and extending through the bottom center hole with a hook attached on the end of the line.

As best shown in FIG. 3, another feature of angled planar board 10 and set 80 may be that fishing line 12 can be configured to be connected to front end 18 of floating member 16 by inserting fishing line 12 through connecting channel 34. Once inserted through connecting channel 34 (i.e. through front hole 24 and out of bottom hole 32), fishing line 12 may include hook or lure 48 at distal end 50 hanging from bottom hole 32 on bottom surface 30. In select embodiments, fishing line 12 may further include slip stop 52. Slip stop 52, also known as a bobber stop, or slip bobber stop, may be positioned on fishing line 12 and can be configured to allow depth 54 of hook or lure 48 from bottom surface 30 to be adjusted. Slip stop 52 may also be used and configured to allow angled planar board 10 to be cast into position in current 14, as with any bobber type configuration. In select embodiments, fishing line 12 may further include swivel connection 56 on fishing line 12. Swivel connection 56 may be configured to allow hook or lure 48 to rotate freely. Swivel connection 56 may also be utilized on fishing line 12 for easily changing out or swapping various hooks or lures 48. In select embodiments, fishing line 12 may further include sinker 58. Sinker 58 may be connected on fishing line 12 approximate hook or lure 48, or between bottom surface 30 of floating member 16 and hook or lure 48. Sinker 58 may be configured to provide weight to fishing line 12 approximate hook or lure 48. Sinker 58 may be adjusted depending on desired depth, amount of wiggle allowed by hook or lure 48, amount of current 14, the like, etc. In other select possibly preferred embodiments, as shown in FIG. 3, fishing line 12 may further include slip stop 52, swivel connection 56, and sinker 58. In other select embodiments, an arm may be included that is attached to floating member 16 for attaching fishing line 12. The arm may have various lengths and angles from floating member 16 for providing adjustability to the angled planar board 10. In these embodiments with the arm for attaching fishing line 12, the length of the arm and/or the angle of the arm from floating member 16 may adjust predictable lateral force 22 to floating member 16 based on current 14.

Figure 4:
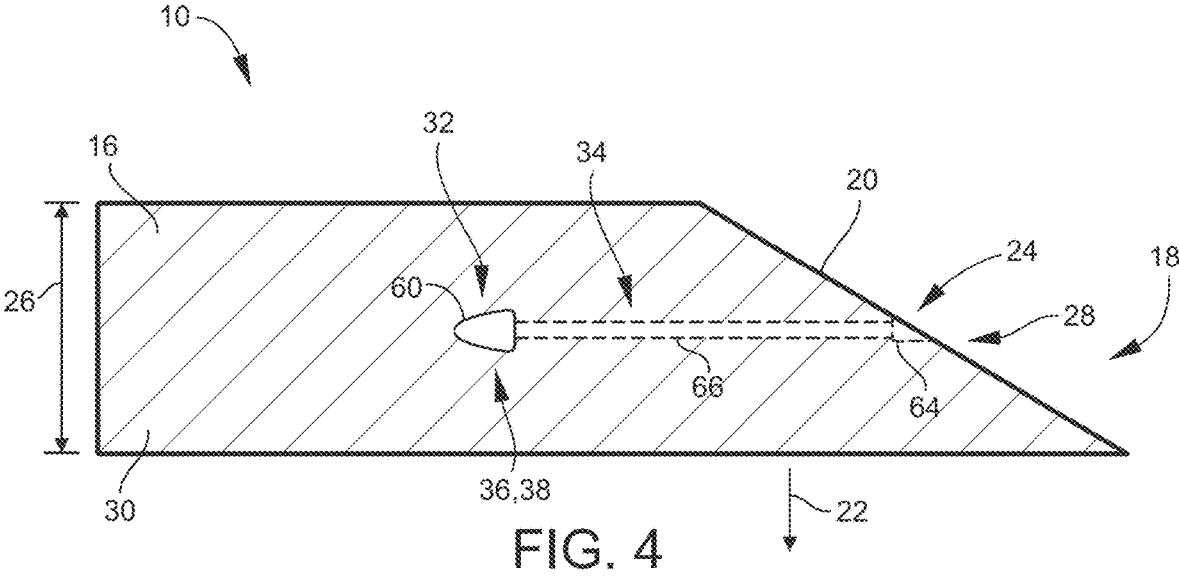
FIG. 4 is a bottom view of an angled planar board according to select embodiments of the instant disclosure showing the connecting channel from the bottom hole to the front hole.
Figure 5:
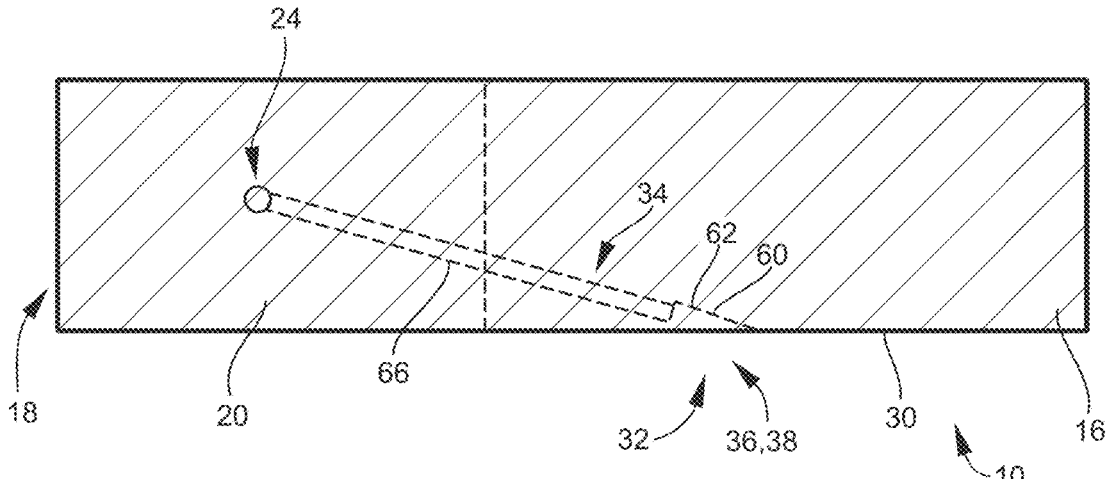
FIG. 5 is a side view of the angled planar board of FIG. 4 showing the connecting channel from the bottom hole to the front hole.
Figure 6:
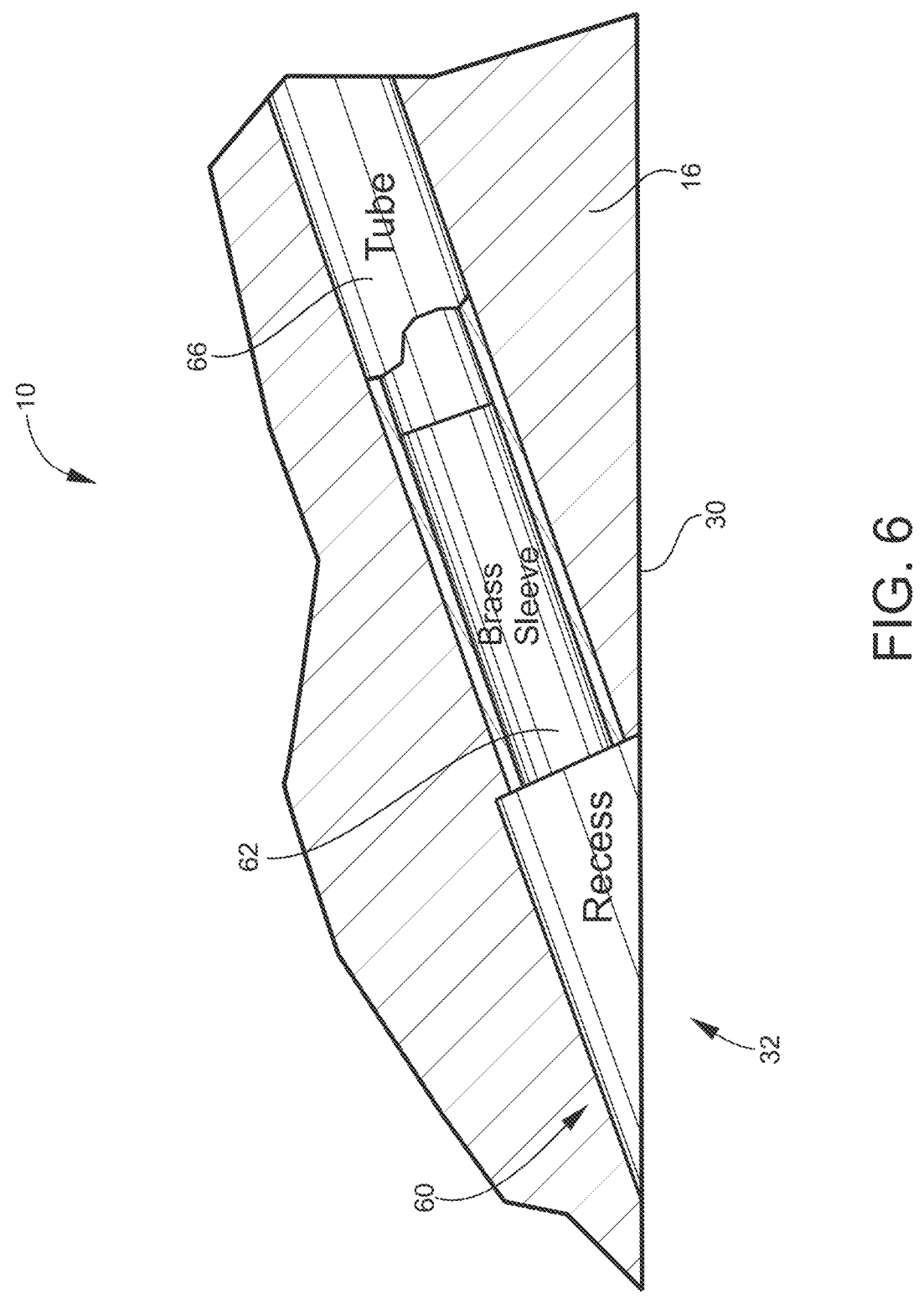
FIG. 6 is a zoomed in cross-sectional side view of the angled planar board of FIG. 4 showing the connecting channel with the recessed hole with the brass sleeve inserted therein with a tube connected to the brass sleeve.
Figure 7:
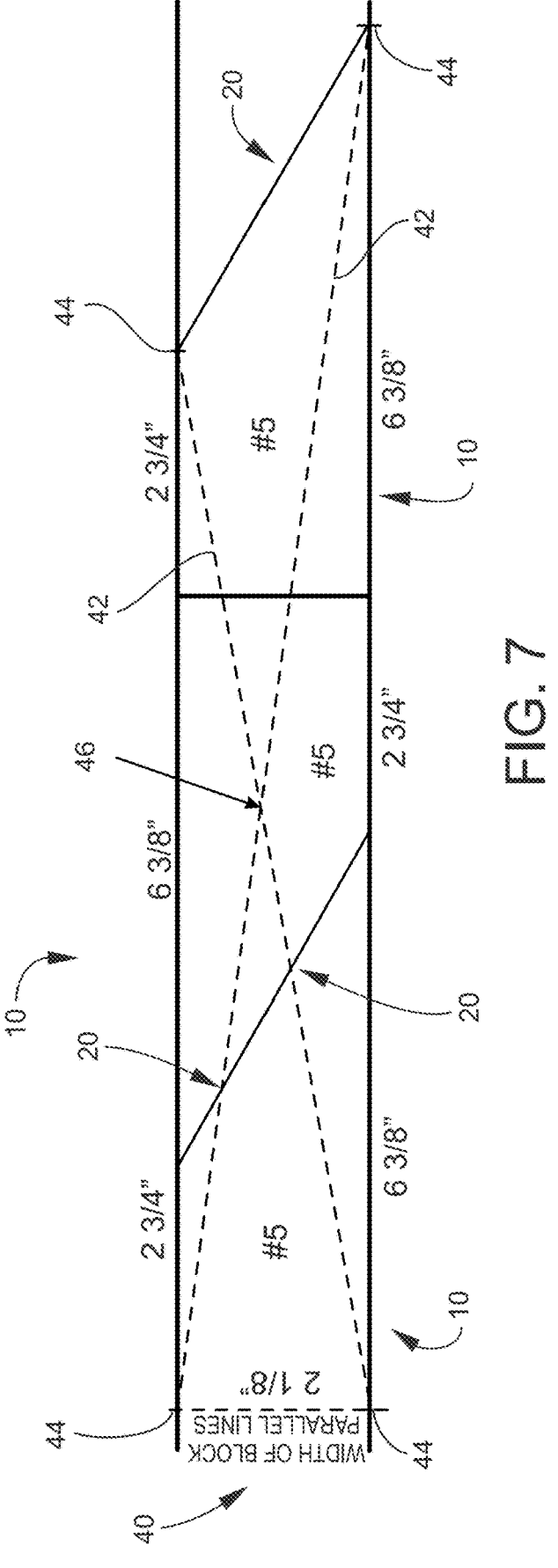
FIG. 7 is a schematic view of a method for determining the centroid of the angled planar boards according to select embodiments of the instant disclosure.
Figures 8, 9:
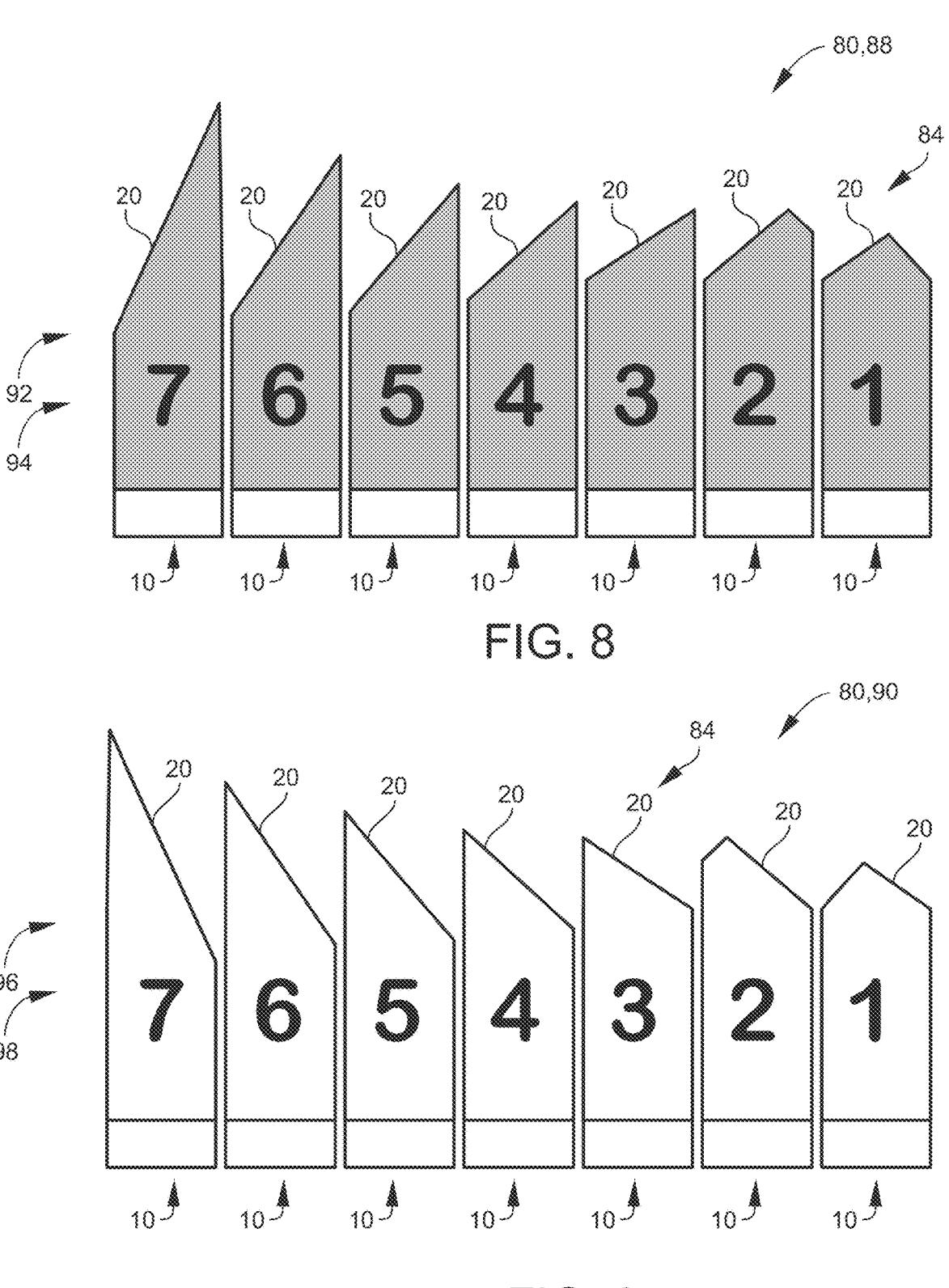
FIG. 8 is a top view of a set of left pulling angled planar boards according to select embodiment of the instant disclosure.
FIG. 9 is a top view of a set of right pulling angled planar boards according to select embodiment of the instant disclosure.
Figures 10, 11:
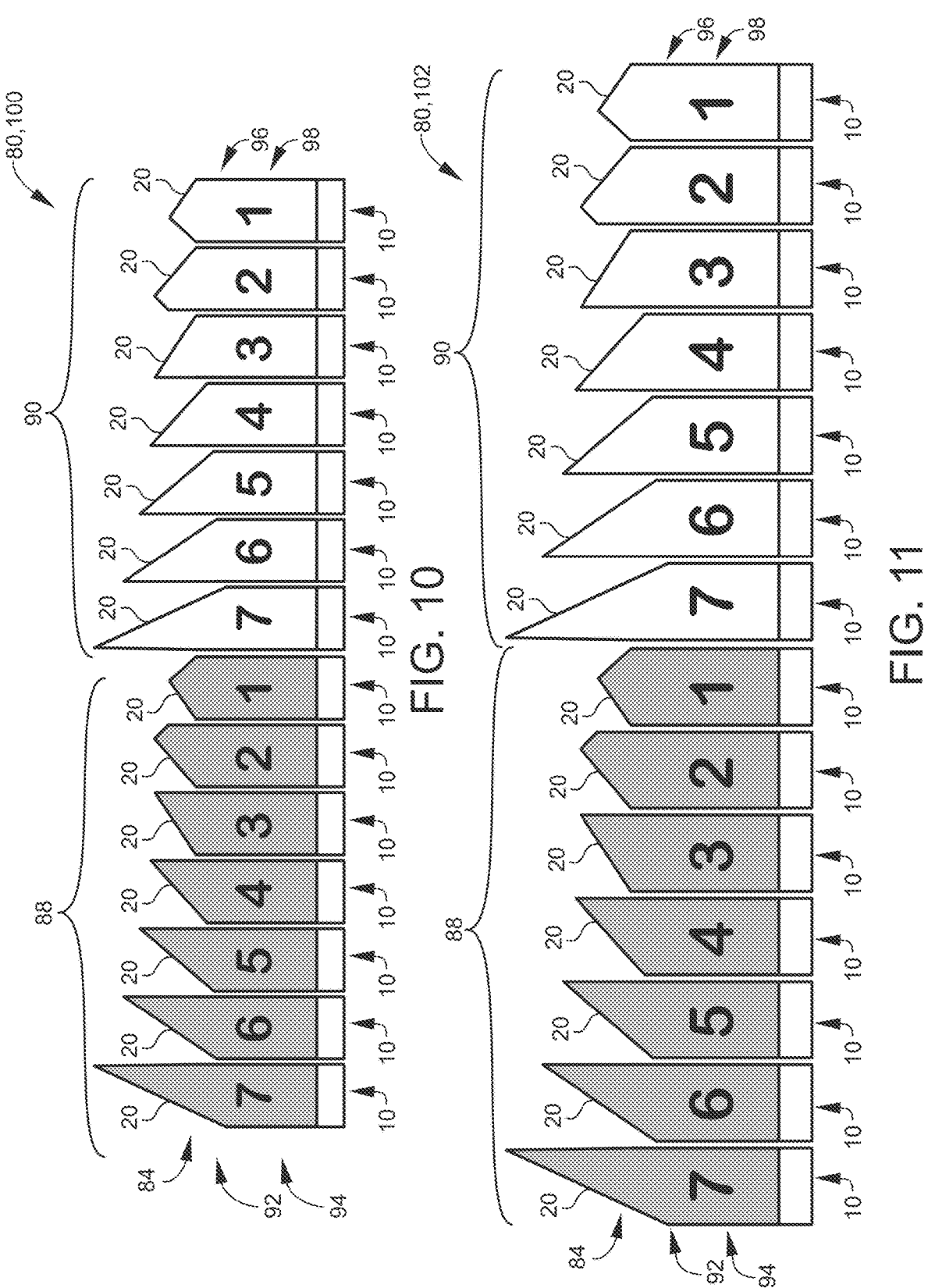
FIG. 10 is a top view of a small set of angled planar boards according to select embodiments of the instant disclosure with a set of 1-7 right pulling angled planar boards and a set of 1-7 left pulling angled planar boards.
FIG. 11 is a top view of a large set of angled planar boards according to select embodiments of the instant disclosure with a set of 1-7 right pulling angled planar boards and a set of 1-7 left pulling angled planar boards.
Figures 12, 13:
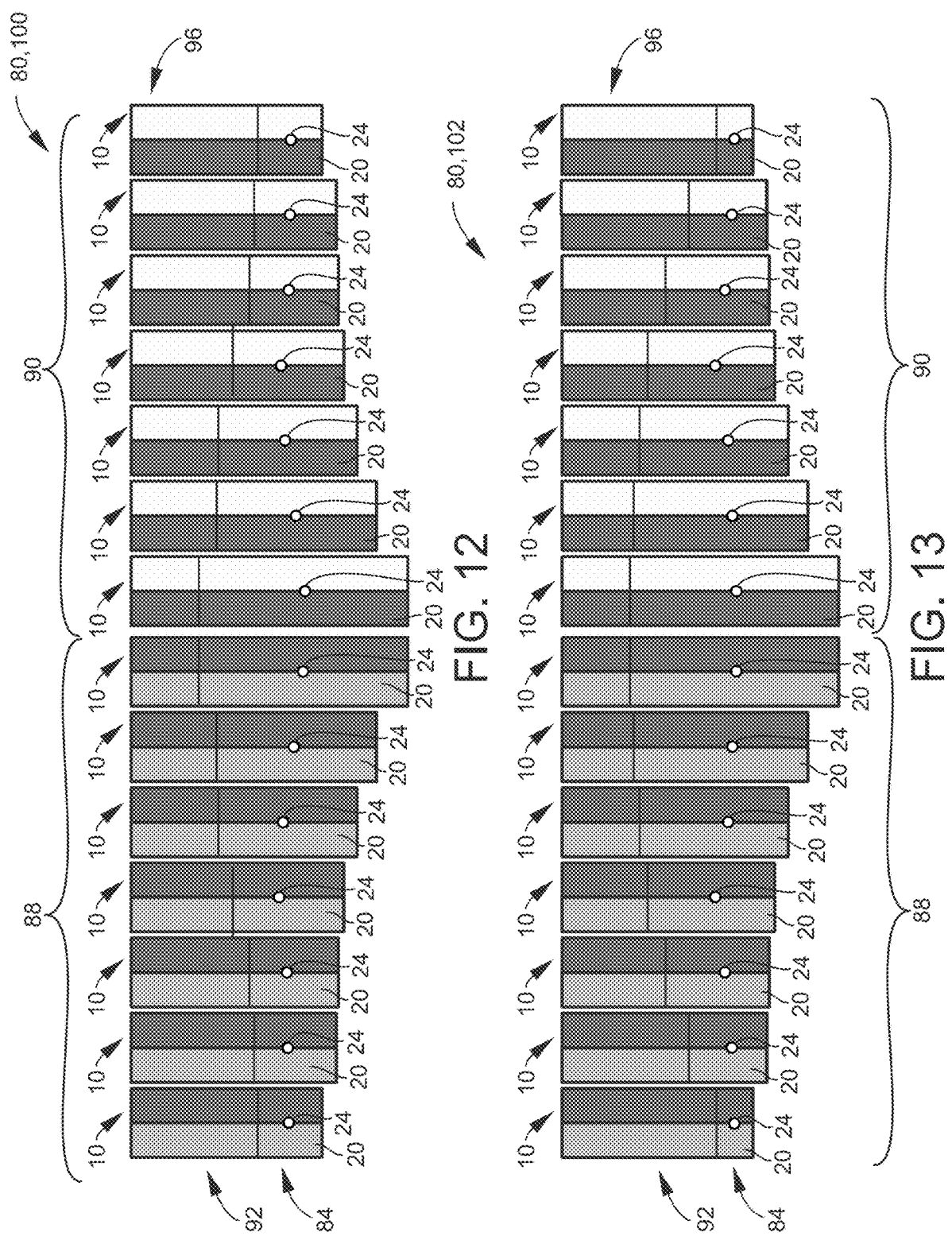
FIG. 12 is an angled side view of the small set of angled planar boards of FIG. 10.
FIG. 13 is an angled side view of the large set of angled planar boards of FIG. 11.

Referring now specifically to FIGS. 4-6, in select embodiments of angled planar board 10 and set 80, connecting channel 34 from front hole 24 to bottom hole 32 may include recess 60 in bottom hole 32. Bottom sleeve 62, like a brass sleeve, may be seated therein recess 60 in bottom hole 32. Likewise, font sleeve 64, like a similar brass sleeve, may be recessed in front hole 24. Tube 66, like a rubber or plastic tube, may be connected between bottom sleeve 62 and font sleeve 64. By utilizing the sleeves 62 and 64 at the entrances of connecting channel 34 with tube 66 connected therebetween, fishing line 12 may easily be fed through floating member 16 from into front hole 24 and out of bottom hole 32, or vice versa.

As best shown in FIGS. 1-2, another feature of angled planar board 10 and set 80 may be the inclusion of color scheme 68. Color scheme 68 may include top portion color 70 on the top half or portion of floating member 16, and bottom portion color 74 on the bottom half or portion of floating member 16. Top portion color 70 may be a highly visible color (like fluorescent oranges, yellows, greens, the like etc.), whereby top portion color 79 may be configured to be visible on top of current 14 to fisherman. Contrarily, bottom portion color 74 may be obscure color 76 (like camouflage colors, greys, browns, greens, the like, etc.), whereby bottom portion color 74 may be configured to be obscured from the sight of fish, or less visible to fish than top portion color 70.

As shown in FIGS. 8-13, another feature of angled planar board 10 and set 80 may be that angled face 20 on front end 18 of floating member 16 may be configured to be adjustable. Having angled face 20 on front end 18 of floating member 16 adjustable may be for providing adjustable lateral force 78 to floating member 16 based on current 14. The adjustability of angled face 20 on front end 18 of floating member 16 may be done by any means or mechanisms for adjusting angled face 20.

In another aspect, the instant disclosure embraces angled planar board 10 in any of the various embodiments and/or combination of embodiments shown and/or described herein.

Referring now specifically to FIGS. 8-17, in another aspect, the instant disclosure embraces set 80 of angled planar boards 10 configured to avoid entanglement of fishing lines 82. Set 80 of angled planar boards 10 may include a set or plurality of angled planar boards 10 in any of the various embodiments and/or combination of embodiments shown and/or described herein. In general, each of the angled planar boards 10 of set 80 may include floating member 16 configured to float. Floating member 16 of each of the angled planar boards 10 of set 80 may include front end 18 with angled face 20. Front hole 24 may be positioned in angled face 20. Wherein, when one of the fishing lines 82 is connected to floating member 16 on front end 18 and floating member 16 is exposed to current 14, angled face 20 may provide predictable lateral force 22 to floating member 16 based on current 14. Angled face 20 of each of the angled planar boards 10 of set 80 may be different. Wherein predictable lateral force 22 to each of the floating members 16 may be different. This feature of having set 80 of angled planar boards 10 each with a different angled face 20 may allow for each of the angled planar boards to be spaced out from one another with spacing 86.

In select embodiments of set 80 of angled planar boards 10, angled face 20 of each of the angled planar boards 10 of the set 80 may be different at calculated interval 84. Wherein, the predictable lateral force 22 to each of the floating members 16 may be different at the calculated interval 84 for spacing each of the angled planar boards 10 of set 80 in current 14.

Set 80 of angled planar boards 10 may include any number of various angled face 20 angled planar boards 10. In select embodiments, set 80 of angled planar boards 10 may include plurality of left pulling angled planar boards 88 and plurality of right pulling angled planar boards 90. In select embodiments, plurality of left pulling angled planar boards 88 may include first color scheme 92 and first numbering scheme 94. First numbering scheme 94 may be configured to identify the different angled faces 20 of each of the plurality of left pulling angled planar boards 88. In select embodiments, the plurality of right pulling angled planar boards 90 may include second color scheme 96 and second numbering scheme 98. Second numbering scheme 98 may be configured to identify the different angled faces 20 of each of the plurality of right pulling angled planar boards 90. Wherein, first color scheme 92 may be dissimilar from second color scheme for differentiating the plurality of left pulling angled planar boards 88 from the plurality of right pulling angled planar boards 90. In select embodiments, the plurality of left pulling angled planar boards 88 may include seven of the left pulling angled planar boards 88 with the first numbering scheme 94 being 1-7. In select embodiments, the plurality of right pulling angled planar boards 90 may include seven of the right pulling angled planar boards 90 with the second numbering scheme 98 being 1-7.

As shown in FIGS. 10-13, set 80 of angled planar boards 10 can be provided or configured in various sizes and shapes. In select embodiments, set 80 of angled planar boards can include small set 100 of angled planar boards 10. In other select embodiments, set 80 of angled planar boards can include large set 102 of angled planar boards 10.

Figures 15, 16:
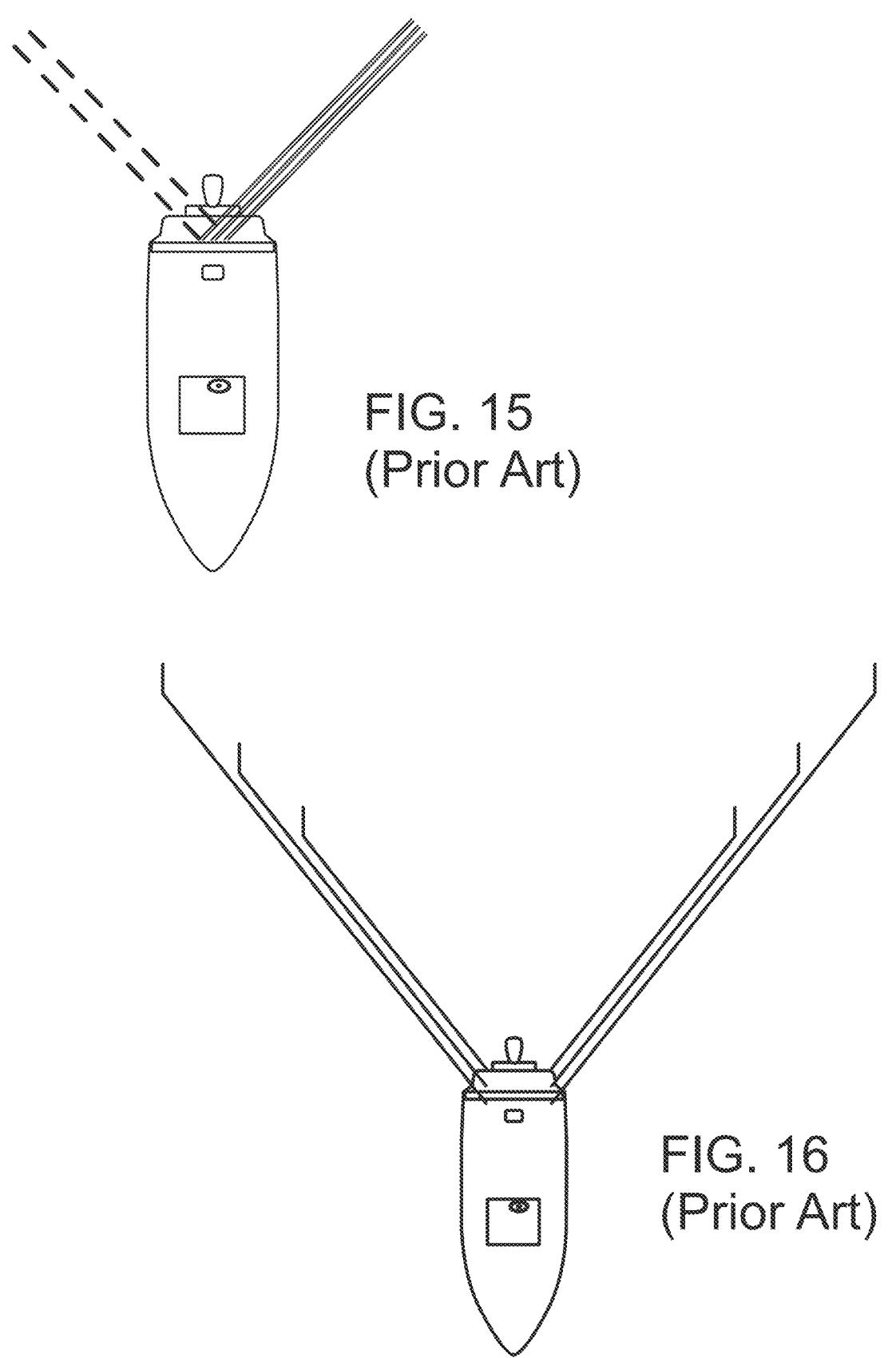
FIG. 15 is a top schematic view of typical planar boards according to the prior art, where they all pull in the same location if rods are placed together, and same length of line is set out.
FIG. 16 is a top schematic view of typical planar boards according to the prior art, where they all pull in the same angle if rods are placed together and varying length of line is set out.

Referring specifically now to FIGS. 14-16, the disclosure is shown in use being dragged or trolled off of the back of the boat. FIGS. 15 and 16 are diagrams of the prior art planar boards being dragged or trolled off of the back of the boat. As shown in FIG. 15, if the same amount of fishing line us used, prior art planar boards would all be dragged or trolled to the same location. As such, as shown in FIG. 16, one solution would be to extend out various lengths of fishing line to keep the planar boards separated. However, neither of these solutions is ideal for easily keeping the planar boards separated to avoid entanglement. As shown in FIG. 14, utilizing the instant disclosure, a single user can drag or troll set 80 of angled planar boards 10 off of the back of a boat where the calculated interval 84 of each angled face 20 of each of the angled planar boards is configured to keep each angled planar board at the calculated spacing 86 between each board. Each angled planar board 10 on each fishing line 12 with angled face 20 is set to provide the appropriate predictable lateral force 22 for separation between the adjacent fishing line 12. Each adjacent fishing line with the adjacent angled planar board 10 has an increasing (or decreasing) angle face 20 to provide lateral separation between the adjacent and multiple fishing lines 12 for use in a system and method according to embodiments of the present disclosure.

Referring now to FIG. 17, similar to the benefit shown in FIG. 14, set 80 of angled planar boards 10 may be utilized for fishing off of the bank of moving water sources, like rivers, streams, tidal waters, the like, etc. As shown, utilizing the instant disclosure, a single user can cast out set 80 of angled planar boards 10 off of the bank where the calculated interval 84 of each angled face 20 of each of the angled planar boards is configured to keep each angled planar board at the calculated spacing 86 between each board. Current 14 from the moving water is exposed to the angled faces 20 of multiple angled planar boards 10 each creating predicable lateral force 22 to separate it from the other angled planar boards 10 for use in method according to select embodiments of the present disclosure. Each fishing line 12 with an angled planar board 10 has the angled face 20 set to provide the predictable lateral force 22 for separation between the adjacent fishing lines 82.

In sum, it is an object of the present disclosure to overcome deficiencies in the prior art by providing processes, systems, and components for the continuous separation and entanglement avoidance of multiple fishing lines 82 during a fishing episode.

In various embodiments, the present disclosure provides a system and process for the separation and entanglement avoidance of fishing lines 82.

In accordance with an aspect of the present disclosure, a process for the separation and entanglement avoidance of fishing lines 82 involves angled planar board 10 or set 80 of angled planar boards 10 designed to utilize the relative mass flow of water, or current 14, around it for the separation of adjacent fishing lines 82 with an adjacent angled planar board 10. Each angled planar board 10 accomplishes it's relative position behind a boat or moving water source via setting of the angled face 20 on its front end 18 of the floating member 16. Therefore, multiple angled planar boards 10 are set with different angled faces 20 which create more or less predictable lateral force 22 to maintain a specific spacing 86 allowing multiple fishing lines 82 to spread apart in a current, like behind a boat or in a moving water source.

In accordance with another aspect of the present invention, a system for the separation and entanglement avoidance of fishing lines includes an angled planar board 10 which is buoyant and is attached to a boat or stationary object in a moving stream of water (i.e. current 14) each proving a relative mass flow of water against the angled planar board 10. The angled planar board 10 may be designed with angled face 20 on its front end 18 which may have adjustable angle. Angled planar board 10 may be tied to the boat or stationary object in a stream of water via fishing line 12 or other attachment according where the fishing line 12 may be attached to the angled planar board 10 downstream with appropriate length of fishing line 12 and bait/hook/sinker trailing below the angled planar board 10.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. An angled planar board, the angled planar board comprising:
   a floating member configured to float, the floating member including:
   a front end, the front end including an angled face;
   wherein, when a fishing line is connected to the floating member on the front end and the floating member is exposed to a current, the angled face provides a predictable lateral force to the floating member based on the current;
   wherein the floating member further including a front hole positioned in the angled face;
   wherein, the front end is configured to be connected to the fishing line on the angled face via the front hole; and
   wherein the front hole is centered about a width of the floating member in the angled face.

2. The angled planar board of claim 1, wherein the floating member further including a bottom surface with a bottom hole positioned therein, the bottom hole is connected with the front hole via a connecting channel.

3. The angled planar board of claim 2, wherein the bottom hole is positioned on the bottom surface at a balance point location of the floating member.

4. The angled planar board of claim 3, wherein the balance point location of the floating member is a centroid of the floating member.

5. The angled planar board of claim 4, wherein the centroid of the floating member is determined by:
   lining up three angled planar boards;
   drawing two lines from furthest points;
   finding an intersection of the two lines; and
   wherein, the intersection of the two lines is the centroid.

6. The angled planar board of claim 2, wherein, the fishing line is configured to be connected to the front end of the floating member by inserting the fishing line through the connecting channel.

7. The angled planar board of claim 6, wherein the fishing line includes a hook or a lure at a distal end hanging from the bottom hole on the bottom surface.

8. The angled planar board of claim 7, wherein the fishing line further includes:

a slip stop positioned on the fishing line configured to allow a depth of the hook or the lure from the bottom surface to be adjusted and to allow the angled planar board to be cast into position in the current;

a swivel connection on the fishing line configured to allow the hook or the lure to rotate freely;

a sinker connected on the fishing line approximate the hook or the lure configured to provide weight to the fishing line approximate the hook or the lure; and combinations thereof.

9. The angled planar board of claim 2, wherein the connecting channel including:

a recess in the bottom hole with a bottom sleeve seated therein;

a font sleeve recessed in the front hole; and a tube connected between the bottom sleeve and the font sleeve.

10. The angled planar board of claim 1, further comprising a color scheme, the color scheme comprising:

a top portion color being a highly visible color, where the top portion color is configured to be visible on top of the current to fisherman; and a bottom portion color being an obscure color, where the bottom portion color is configured to be obscured from fish.

11. An angled planar board, the angled planar board comprising:

a floating member configured to float, the floating member including:

a front end, the front end including an angled face;

a front hole positioned in the angled face, the front hole is centered about a width of the floating member in the angled face;

a bottom surface with a bottom hole positioned therein, the bottom hole is positioned on the bottom surface at a balance point location of the floating member, the bottom hole is connected with the front hole via a connecting channel, wherein the connecting channel including:

a recess in the bottom hole with a bottom sleeve seated therein;

a font sleeve recessed in the front hole; and a tube connected between the bottom sleeve and the font sleeve;

wherein, the front end is configured to be connected to a fishing line on the angled face via the front hole;

wherein, the fishing line is configured to be connected to the front end of the floating member by inserting the fishing line through the connecting channel;

wherein the fishing line includes a hook or a lure at a distal end hanging from the bottom hole on the bottom surface;

wherein, when the fishing line is connected to the floating member on the front end and the floating member is exposed to a current, the angled face providing a predictable lateral force to the floating member based on the current;

wherein the fishing line further includes:

a slip stop positioned on the fishing line configured to allow a depth of the hook or the lure from the bottom surface to be adjusted and to allow the angled planar board to be cast into position in the current;

a swivel connection on the fishing line configured to allow the hook or the lure to rotate freely;

a sinker connected on the fishing line approximate the hook or the lure configured to provide weight to the fishing line approximate the hook or the lure; and combinations thereof.

12. A set of angled planar boards configured to avoid entanglement of fishing lines in a current, each of the angled planar boards of the set comprising:

a floating member configured to float, the floating member including:

a front end, the front end including an angled face;

a front hole positioned in the angled face wherein, when one of the fishing lines is connected to the floating member on the front end and the floating member is exposed to the current, the angled face providing a predictable lateral force to the floating member based on the current; and wherein, the angled face of each floating member of the set of angled planar boards is different, wherein the predictable lateral force to each of the floating members is different.

13. The set of angled planar boards of claim 12, wherein each angled planar board of the set of angled planar boards further comprising:

the front hole is centered about a width of the floating member in the angled face;

a bottom surface with a bottom hole positioned therein, the bottom hole is positioned on the bottom surface at a balance point location of the floating member, the bottom hole is connected with the front hole via a connecting channel, wherein the connecting channel including:

a recess in the bottom hole with a bottom sleeve seated therein;

a font sleeve recessed in the front hole; and a tube connected between the bottom sleeve and the font sleeve;

wherein, the front end is configured to be connected to one of the fishing lines on the angled face via the front hole;

wherein, the one of the fishing lines is configured to be connected to the front end of the floating member by inserting the one of the fishing lines through the connecting channel;

wherein the one of the fishing lines includes a hook or a lure at a distal end hanging from the bottom hole on the bottom surface;

wherein the one of the fishing lines further includes:

a slip stop positioned on the one of the fishing lines configured to allow a depth of the hook or the lure from the bottom surface to be adjusted and to allow the angled planar board to be cast into position in the current;

a swivel connection on the one of the fishing lines configured to allow the hook or the lure to rotate freely;

a sinker connected on the one of the fishing lines approximate the hook or the lure configured to provide weight to the one of the fishing lines approximate the hook or the lure; and combinations thereof.

14. The set of angled planar boards of claim 12, wherein, the angled face of each of the angled planar boards of the set of angled planar boards is different at a calculated interval, wherein the predictable lateral force to each of the floating members is different at the calculated interval for spacing each of the set of angled planar boards in the current.

15. The set of angled planar boards of claim 12 comprising a plurality of left pulling angled planar boards and a plurality of right pulling angled planar boards.

16. The set of angled planar boards of claim 15, wherein:

the plurality of left pulling angled planar boards including a first color scheme and a first numbering scheme, the first numbering scheme is configured to identify the different angled faces of each of the plurality of left pulling angled planar boards;

the plurality of right pulling angled planar boards including a second color scheme and a second numbering scheme, the second numbering scheme is configured to identify the different angled faces of each of the plurality of right pulling angled planar boards; and wherein, the first color scheme is dissimilar from the second color scheme for differentiating the plurality of left pulling angled planar boards from the plurality of right pulling angled planar boards.

17. The set of angled planar boards of claim 16 wherein:

the plurality of left pulling angled planar boards including seven of the left pulling angled planar boards with the first numbering scheme being 1-7; and the plurality of right pulling angled planar boards including seven of the right pulling angled planar boards with the second numbering scheme being 1-7.

\* \* \* \* \*